US012776882B2

(12) United States Patent
Ling et al.

(10) Patent No.: US 12,776,882 B2
(45) Date of Patent: Oct. 27, 2026

(54) METHOD AND APPARATUS FOR BEAM DETERMINATION

(71) Applicant: Lenovo (Beijing) Limited, Beijing (CN)

(72) Inventors: Wei Ling, Beijing (CN); Yi Zhang, Beijing (CN); Chenxi Zhu, Beijing (CN); Bingchao Liu, Beijing (CN); Lingling Xiao, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 286 days.

(21) Appl. No.: 18/696,735

(22) PCT Filed: Sep. 30, 2021

(86) PCT No.: PCT/CN2021/122405

§ 371 (c)(1),
(2) Date: Mar. 28, 2024

(87) PCT Pub. No.: WO2023/050402

PCT Pub. Date: Apr. 6, 2023

(65) Prior Publication Data

US 2024/0405947 A1 Dec. 5, 2024

(51) Int. Cl.

*H04L 5/00* (2006.01)
*H04W 72/044* (2023.01)
*H04W 72/231* (2023.01)

(52) U.S. Cl.

CPC .......... *H04L 5/0053* (2013.01); *H04L 5/0051* (2013.01); *H04W 72/046* (2013.01); *H04W 72/231* (2023.01)

(58) Field of Classification Search

CPC ........................... H04W 72/231; H04L 5/0051

(Continued)

(56) References Cited

U.S. PATENT DOCUMENTS

2020/0045709 A1 2/2020 Seo et al.
2020/0288479 A1 9/2020 Xi et al.

(Continued)

FOREIGN PATENT DOCUMENTS

CN 112806083 A 5/2021
WO 2021095025 A1 5/2021

(Continued)

OTHER PUBLICATIONS

"Extended European Search Report", EP Application No. 21958972.8, May 27, 2025, 12 pages.

(Continued)

*Primary Examiner* — Dang T Ton
(74) *Attorney, Agent, or Firm* — FIG. 1 Patents

(57) ABSTRACT

Embodiments of the present application relate to methods and apparatuses for beam determination. An exemplary method for beam determination may include: receiving an indication indicating a joint or DL common beam mechanism is applied for a set of CORESETs configured for a UE in a cell; and for a CORESET of the set of CORESETs, in the case that there are two joint or DL common TCI states indicated by a TCI codepoint in a TCI field in a DCI are applicable in a slot, monitoring PDCCH in the CORESET in the slot, wherein: in the case that the CORESET is only able to be configured with one TCI state, the DM-RS antenna port of the PDCCH is quasi co-located with a set of RSs in one joint or DL common TCI state of the two joint or DL common TCI states, wherein the one joint or DL common TCI state is determined for the CORESET based on default configuration information or signaled configuration information.

20 Claims, 6 Drawing Sheets

(58) Field of Classification Search
USPC ................................ 370/329, 401, 402, 403
See application file for complete search history.

(56) References Cited

U.S. PATENT DOCUMENTS

| | | | |
|---|---|---|---|
| 2021/0105860 A1 | 4/2021 | Tsai et al. | |
| 2025/0274945 A1* | 8/2025 | Zhang | H04L 5/0053 |

FOREIGN PATENT DOCUMENTS

| | | |
|---|---|---|
| WO | 2021142782 A1 | 7/2021 |
| WO | 2021175237 A1 | 9/2021 |
| WO | 2021182837 A1 | 9/2021 |

OTHER PUBLICATIONS

"Foreign Office Action", GB Application No. 2409150.6, Jun. 16, 2025, 4 pages.
Ericsson, "Enhancement on HST-SFN deployment", 3GPP TSG-RAN WG1 Meeting #105-e, R1-2105586, 2021, 23 pages.
PCT/CN2021/122405 , "International Preliminary Report on Patentability", International Application No. PCT/CN2021/122405, Apr. 2, 2024, 4 pages.
PCT/CN2021/122405 , "International Search Report and Written Opinion", International Application No. PCT/CN2021/122405, Jun. 27, 2022, 6 pages.
ZTE , "Discussion on Multi-TRP HST enhancements", 3GPP TSG RAN WG1 #106-e, R1-2106545, e-Meeting, retrieved from the internet on Jun. 18, 2024, <https://www.3gpp.org/ftp/TSG_RAN/WG1_RL1/TSGR1_106-e/Docs/>, Aug. 16, 2021, 13 pages.

* cited by examiner

| | | | | | | | |
|---|---|---|---|---|---|---|---|
| R | R | R | Serving Cell ID | | | | |
| CORESET ID | | | | R | R | R | C |
| … | | | | | | | |
| CORESET ID | | | | R | R | R | C |

FIG. 3

| | | | | | | | |
|---|---|---|---|---|---|---|---|
| R | R | R | Serving Cell ID | | | | |
| $C_7$ | $C_6$ | $C_5$ | $C_4$ | $C_3$ | $C_2$ | $C_1$ | $C_0$ |
| $C_{15}$ | $C_{14}$ | $C_{13}$ | $C_{12}$ | $C_{11}$ | $C_{10}$ | $C_9$ | $C_8$ |

FIG. 4

METHOD AND APPARATUS FOR BEAM DETERMINATION

TECHNICAL FIELD

Embodiments of the present application are related to wireless communication technology, especially, related to a method and apparatus for beam determination.

BACKGROUND OF THE INVENTION

Regarding enhancements on multiple-input multiple-output (MIMO) for new radio (NR), a work item description (WID) approved in NR R17 includes enhancement on multi-beam operation, mainly targeting frequency range (FR)2 while also applicable to FR1. Wherein, a research topic is to identify and specify features to facilitate more efficient (lower latency and overhead) downlink/uplink (DL/UL) beam management to support higher intra-band and L1/L2-centric inter-cell mobility and/or a larger number of configured transmission configuration indication (TCI) states, including common beam for data and control transmission/reception for DL and UL, especially for intra-band carrier aggregation (CA).

In addition, it has been agreed that downlink control information (DCI) format 1_1 and DCI format 1_2 can be reused for joint or DL common beam indication in RAN1 #103e, and the joint or DL common beam can be applied for physical downlink shared channel (PDSCH) and all or part of control resource sets (CORESETs). In R17, only one joint or DL common beam is indicated for DL transmission, and thus, only one joint or DL common beam is used for physical downlink control channel (PDCCH) reception. Although common beam indication in a scenario of multiple transmit-receive points (TRPs) will not be discussed in R17, it may be further studied in R18 which has been discussed in R18 workshop. Then, more than one joint or DL common beam may be indicated by DCI for the scenario of multiple TRPs in R18. Accordingly, when multiple joint or DL common beams, e.g., two joint or DL common beams are applicable for a CORESET in a slot, the beam(s) of a CORESET can be the two joint or DL common beams or only one joint or DL common beam of the two joint or DL common beams.

Therefore, how to determine beam(s) for a CORESET, especially, how to determine common beam(s) for PDCCH in a CORESET in a cell should be studied and solved.

SUMMARY

One objective of the embodiments of the present application is to provide a technical solution for beam determination, especially for beam determination for PDCCH of a CORESET which may be able to be configured with all or part of more than one joint or DL common beam applicable for the CORESET in a slot.

Some embodiments of the present application provide an apparatus, which includes: at least one receiving circuitry; at least one transmitting circuitry; and at least one processor coupled to the at least one receiving circuitry and the at least one transmitting circuitry, wherein the at least one processor is configured to: receive an indication indicating a joint or DL common beam mechanism is applied for a set of CORESETs configured for a user equipment (UE) in a cell; and for a CORESET of the set of CORESETs, in the case that there are two joint or DL common TCI states indicated by a TCI codepoint in a TCI field in a DCI are applicable in a slot, monitor PDCCH in the CORESET in the slot, wherein: in the case that the CORESET is able to be configured with two TCI states, a demodulation-reference signal (DM-RS) antenna port of the PDCCH is quasi co-located (QCL) with a set of RSs in the two joint or DL common TCI states with respect to a set of QCL parameters; and in the case that the CORESET is only able to be configured with one TCI state, the DM-RS antenna port of the PDCCH is quasi co-located with a set of RSs in one joint or DL common TCI state of the two joint or DL common TCI states, wherein the one joint or DL common TCI state is determined for the CORESET based on default configuration information or signaled configuration information.

Some other embodiments of the present application provide another apparatus, which includes: at least one receiving circuitry; at least one transmitting circuitry; and at least one processor coupled to the at least one receiving circuitry and the at least one transmitting circuitry, wherein the at least one processor is configured to: transmit an indication indicating a joint or DL common beam mechanism is applied for a set of CORESETs configured for a UE in a cell; and for a CORESET of the set of CORESETs, in the case that there are two joint or DL common TCI states indicated by a TCI codepoint in a TCI field in a DCI are applicable in a slot, transmit PDCCH in the CORESET in the slot, wherein: in the case that the CORESET is able to be configured with two TCI states, a DM-RS antenna port of the PDCCH is quasi co-located with a set of RSs in the two joint or DL common TCI states with respect to a set of QCL parameters; and in the case that the CORESET is only able to be configured with one TCI state, the DM-RS antenna port of the PDCCH is quasi co-located with a set of RSs in one joint or DL common TCI state of the two joint or DL common TCI states, wherein the one joint or DL common TCI state is determined for the CORESET based on default configuration information or signaled configuration information.

In some embodiments of the present application, the default configuration information indicates a first one of the two joint or DL common TCI states will be determined for the CORESET, or indicates a second one of the two joint or DL common TCI states will be determined for the CORESET.

In some embodiments of the present application, the signaled configuration information is indicated by a radio resource control (RRC) signaling associated with the CORESET, indicating a first one of the two joint or DL common TCI states will be determined for the CORESET or indicating a second one of the two joint or DL common TCI states will be determined for the CORESET.

In some embodiments of the present application, the signaled configuration information is indicated by a medium access control (MAC) control element (CE) associated with the CORESET, indicating a first one of the two joint or DL common TCI states will be determined for the CORESET or indicating a second one of the two joint or DL common TCI states will be determined for the CORESET. According to some embodiments of the present application, the MAC CE indicates an identity of the cell for which the MAC CE is applied, an identity of at least one CORESET only able to be configured with one TCI state in the cell, and which one of the two joint or DL common TCI states will be determined for a corresponding CORESET of the at least one CORESET only able to be configured with one TCI state. According to some other embodiments of the present application, the MAC CE indicates an identity of the cell for which the MAC CE is applied, and which one of the two joint or DL common TCI states will be determined for a corresponding CORESET only able to be configured with one TCI state in the cell identified by a bit map.

In some embodiments of the present application, the signaled configuration information is indicated in a corresponding field of the DCI, indicating a first one of the two joint or DL common TCI states will be determined for the CORESET or indicating a second one of the two joint or DL common TCI states will be determined for the CORESET. The corresponding field in the DCI is applicable from a first slot which is at least a number of symbols of acknowledgment of the DCI, wherein the number of symbols is configured by a RRC signalling based on a capability of the UE. According to some embodiments of the present application, each bit of the corresponding field indicates which one of the two joint or DL common TCI states is determined for a corresponding CORESET of a subset of the set of CORESETs, wherein each CORESET of the subset of the set of CORESETs is only able to be configured with one TCI state. According to some other embodiments of the present application, the set of CORESETs are grouped into a plurality of CORESET groups according to a RRC signaling. Each bit of the corresponding field indicates which one of the two joint or DL common TCI states is determined for at least one CORESET of a corresponding CORESET group of the plurality of CORESET groups, wherein the at least one CORESET is only able to be configured with one TCI state.

In some embodiments of the present application, whether the CORESET is able to be configured with two TCI states or is only able to be configured with one TCI state is indicated by a RRC signaling.

Some embodiments of the present application provide a method, including: receiving an indication indicating a joint or DL common beam mechanism is applied for a set of CORESETs configured for a UE in a cell; and for a CORESET of the set of CORESETs, in the case that there are two joint or DL common TCI states indicated by a TCI codepoint in a TCI field in a DCI are applicable in a slot, monitoring PDCCH in the CORESET in the slot, wherein: in the case that the CORESET is able to be configured with two TCI states, a DM-RS antenna port of the PDCCH is quasi co-located with a set of RSs in the two joint or DL common TCI states with respect to a set of QCL parameters; and in the case that the CORESET is only able to be configured with one TCI state, the DM-RS antenna port of the PDCCH is quasi co-located with a set of RSs in one joint or DL common TCI state of the two joint or DL common TCI states, wherein the one joint or DL common TCI state is determined for the CORESET based on default configuration information or signaled configuration information.

Some other embodiments of the present application provide another method, including: transmitting an indication indicating a joint or DL common beam mechanism is applied for a set of CORESETs configured for a UE in a cell; and for a CORESET of the set of CORESETs, in the case that there are two joint or DL common TCI states indicated by a TCI codepoint in a TCI field in a DCI are applicable in a slot, transmitting PDCCH in the CORESET in the slot, wherein: in the case that the CORESET is able to be configured with two TCI states, a DM-RS antenna port of the PDCCH is quasi co-located with a set of RSs in the two joint or DL common TCI states with respect to a set of QCL parameters; and in the case that the CORESET is only able to be configured with one TCI state, the DM-RS antenna port of the PDCCH is quasi co-located with a set of RSs in one joint or DL common TCI state of the two joint or DL common TCI states, wherein the one joint or DL common TCI state is determined for the CORESET based on default configuration information or signaled configuration information.

Some yet other embodiments of the present application also provide an apparatus, including: at least one non-transitory computer-readable medium having stored thereon computer-executable instructions; at least one receiving circuitry; at least one transmitting circuitry; and at least one processor coupled to the at least one non-transitory computer-readable medium, the at least one receiving circuitry and the at least one transmitting circuitry. The computer-executable instructions cause the at least one processor to implement any method according to an embodiment of the present application with the at least one receiving circuitry and the at least one transmitting circuitry.

Embodiments of the present application can solve the beam determination for a CORESET when multiple (e.g., two) joint or DL common beams are applicable for the CORESET in a slot, and thus will facilitate the deployment and implementation of the NR.

BRIEF DESCRIPTION OF THE DRAWINGS

In order to describe the manner in which advantages and features of the present application can be obtained, a description of the present application is rendered by reference to specific embodiments thereof which are illustrated in the appended drawings. These drawings depict only exemplary embodiments of the present application and are not therefore intended to limit the scope of the present application.

FIG. 3 illustrates an exemplary MAC CE designed under Scheme 3 according to some embodiments of the present application;

FIG. 4 illustrates another exemplary MAC CE designed under Scheme 3 according to some other embodiments of the present application;

DETAILED DESCRIPTION

The detailed description of the appended drawings is intended as a description of the currently preferred embodiments of the present application and is not intended to represent the only form in which the present application may be practiced. It is to be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3rd generation partnership project (3GPP) 5G, 3GPP long term evolution (LTE) Release 8 and so on. It is contemplated that along with the developments of network architectures and new service scenarios, all embodiments in the present application are also applicable to similar technical problems; and moreover, the terminologies recited in the present application may change, which should not affect the principle of the present application.

Figure 1:
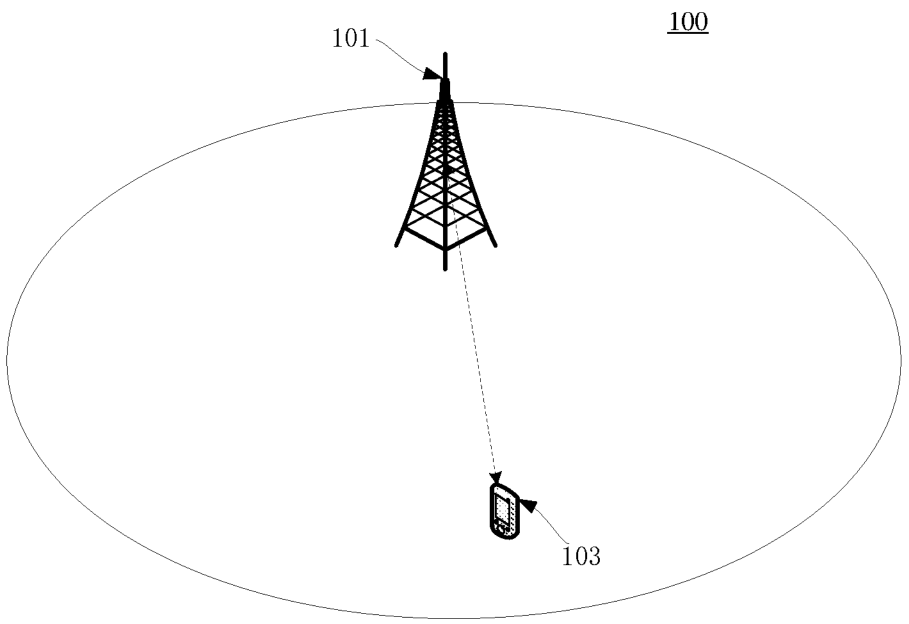
FIG. 1 is a schematic diagram illustrating an exemplary wireless communication system according to some embodiments of the present application.

FIG. 1 illustrates a schematic diagram of an exemplary wireless communication system 100 according to some embodiments of the present application.

As shown in FIG. 1, the wireless communication system 100 includes a UE 103 and a BS 101. Although merely one BS is illustrated in FIG. 1 for simplicity, it is contemplated that the wireless communication system 100 may include more BSs in some other embodiments of the present application. Similarly, although merely one UE is illustrated in FIG. 1 for simplicity, it is contemplated that the wireless communication system 100 may include more UEs in some other embodiments of the present application.

The BS 101 may also be referred to as an access point, an access terminal, a base, a macro cell, a node-B, an enhanced node B (eNB), a gNB, a home node-B, a relay node, or a device, or described using other terminology used in the art. The BS 101 is generally part of a radio access network that may include a controller communicably coupled to the BS 101.

The UE 103 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to an embodiment of the present application, the UE 103 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the UE 103 may include wearable devices, such as smart watches, fitness bands, optical head-mounted displays, or the like. Moreover, the UE 103 may be referred to as a subscriber unit, a mobile, a mobile station, a user, a terminal, a mobile terminal, a wireless terminal, a fixed terminal, a subscriber station, a user terminal, or a device, or described using other terminology used in the art.

The wireless communication system 100 is compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

In R17, common beam for data and control transmission/reception for DL and UL, especially for intra-band CA is introduced to improve latency and efficiency with more usage of dynamic control signaling. The terminology "beam" can be represented by or associated with spatial relation information, TCI state, RS etc. For example, a beam for PDCCH reception can be represented by a DM-RS antenna port associated with PDCCH reception in a CORESET which is quasi co-located with a set of downlink RS. Specifically, according to a UE procedure for determining PDCCH assignment in TS 38.213 in R15/R16, For a CORESET other than a CORESET with index 0, if a UE has not been provided a configuration of TCI state(s) by tci-StatesPDCCH-ToAddList and tci-StatesPDCCH-ToReleaseList for the CORESET, or has been provided initial configuration of more than one TCI states for the CORESET by tci-StatesPDCCH-ToAddList and tci-StatesPDCCH-ToReleaseList but has not received a MAC CE activation command for one of the TCI states as described in [11, TS 38.321], the UE assumes that the DM-RS antenna port associated with PDCCH receptions is quasi co-located with the SS/PBCH block the UE identified during the initial access procedure;

if a UE has been provided a configuration of more than one TCI states by tci-StatesPDCCH-ToAddList and tci-StatesPDCCH-ToReleaseList for the CORESET as part of Reconfiguration with sync procedure as described in [12, TS 38.331] but has not received a MAC CE activation command for one of the TCI states as described in [11, TS 38.321], the UE assumes that the DM-RS antenna port associated with PDCCH receptions is quasi co-located with the SS/PBCH block or the CSI-RS resource the UE identified during the random access procedure initiated by the Reconfiguration with sync procedure as described in [12, TS 38.331].

For a CORESET with index 0, the UE assumes that a DM-RS antenna port for PDCCH receptions in the CORESET is quasi co-located with the one or more DL RS configured by a TCI state, where the TCI state is indicated by a MAC CE activation command for the CORESET, if any, or a SS/PBCH block the UE identified during a most recent random access procedure not initiated by a PDCCH order that triggers a contention-free random access procedure, if no MAC CE activation command indicating a TCI state for the CORESET is received after the most recent random access procedure.

For a CORESET other than a CORESET with index 0, if a UE is provided a single TCI state for a CORESET, or if the UE receives a MAC CE activation command for one of the provided TCI states for a CORESET, the UE assumes that the DM-RS antenna port associated with PDCCH receptions in the CORESET is quasi co-located with the one or more DL RS configured by the TCI state. For a CORESET with index 0, the UE expects that QCL-TypeD of a CSI-RS in a TCI state indicated by a MAC CE activation command for the CORESET is provided by a SS/PBCH block if the UE receives a MAC CE activation command for one of the TCI states, the UE applies the activation command in the first slot that is after slot $$k + 3N_{slot}^{subframe,\mu}$$

where k is the slot where the UE would transmit a Vslot PUCCH with HARQ-ACK information for the PDSCH providing the activation command and μ is the SCS configuration for the PUCCH. The active BWP is defined as the active BWP in the slot when the activation command is applied.

It has been agreed to reuse DCI format 1_1 and DCI format 1_2 for joint or DL common beam indication in R17. When a joint or DL common beam is indicated by DCI in a PDCCH (hereafter, "DCI in a PDCCH" is also referred to a DCI), it will be applied to all or part of a set of CORESETs configured for a UE and all PDSCHs. In R17, only one joint or DL common beam is indicated for DL transmission, and thus, only one joint or DL common beam is used for PDCCH reception. In R18, two or more joint or DL common beams may be indicated for DL transmission for multiple TRP transmission. In addition, in R17, it has been agreed that up to two TCI states can be indicated for a CORESET with single frequency network (SFN) manner (or mode) where the same PDCCH of a CORESET is transmitted from multiple TRPs in the same time-frequency resources. PDCCH works in a SFN manner according to the number of TCI states activated for the associated CORESET and a RRC parameter which may be sfnSchemeA (scheme 1) or sfnSchemeB (TRP-based pre-compensation scheme). Besides, single-TRP PDCCH can schedule a R17 SFN PDSCH or a R16 scheme 1a/2a/2b/3/4 PDSCH. Therefore, when two joint or DL common beams are indicated for DL transmission for multi-TRP transmission in R18, only one of the two joint or DL common beams can be used for PDCCH reception if the SFN mode is not configured for the associated CORESET and two joint or DL common beams will be used for PDCCH reception if the SFN mode is configured for the associated CORESET. That is, if two joint or DL common beams are applicable for a CORESET in a slot, the beam(s) of PDCCH in the CORESET can be the two joint or DL common beams or only one joint or DL common beam of the two joint or DL common beams. Therefore, how to determine the beam(s) for PDCCH in a CORESET should be solved considering that two or more joint or DL common beams are applicable for the CORESET in a slot while the CORESET may be able to be configured with the two or more joint or DL common beams or not.

At least for solving the above technical problems, embodiments of the present application provide a technical solution for beam determination, especially for beam determination of PDCCH in a CORESET when there are two or more joint or DL common beams are applicable for the CORESET in a slot.

According to some embodiments of the present application, the network side e.g., a BS 101 as shown in FIG. 1 will configure one or more CORESETs for a UE in a cell (or serving cell), e.g., a UE 101 as shown in FIG. 1. A joint or DL common beam mechanism may not be applied to all of the one or more CORESETs configured for the UE in the cell. When a joint or DL common beam mechanism is applied for a set of CORESETs of the one or more CORESETs, a common beam indication mode introduced in R17 or the like is applied. When a joint or DL common beam mechanism is not applied for a set of CORESETs of the one or more CORESETs, a legacy beam indication mode as provided in TS38.213 or the like is applied. Herein, only the set of CORESETs where a joint or DL common beam mechanism is applied are considered in the following embodiments of the specification. The set of CORESETs of the one or more CORESETs include all or part of the one or more CORESETs.

Figure 2:
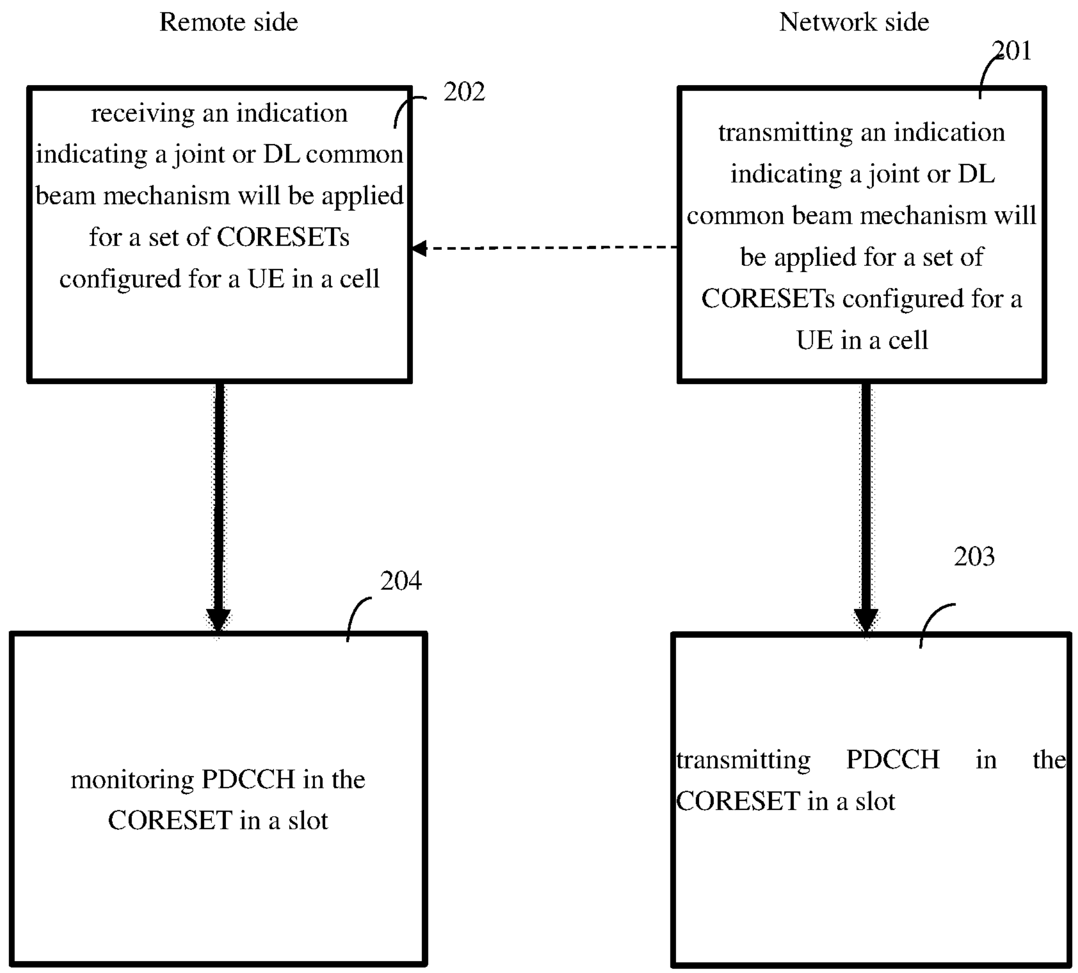
FIG. 2 illustrates a flow chart of a method for beam determination according to some embodiments of the present application.

FIG. 2 illustrates a flow chart of a method for beam determination according to some embodiments of the present application. Although the method is illustrated in a system level by an apparatus in a remote side (or a UE side) and an apparatus in a network side (or a BS side), persons skilled in the art should understand that the method implemented in the remote side and that implemented in the network side can be separately implemented and incorporated by other apparatus with the like functions.

As shown in FIG. 2, in step 201, the apparatus in network side, e.g., a BS 101 as shown in FIG. 1 will transmit an indication, indicating a joint or DL common beam mechanism will be applied for a set of CORESETs configured for a UE in a cell. Herein (throughout the specification), the wording "a set of" means "at least one" or "one or more." Accordingly, in the remote side, the indication will be received from the network side in step 202 by the apparatus in the remote side, e.g., the UE 103 as shown in FIG. 1, which indicates that a joint or DL common beam mechanism will be applied for the set of CORESETs configured for the UE in the cell. In some embodiments of the present application, a high layer signaling transmitting the indication is a RRC signaling. For example, the indication is a configuration of a RRC parameter. In the case that the RRC parameter is configured as "enable," it indicates that the joint or DL common beam mechanism, e.g., the common beam indication mode is applied for the set of CORESETs. In the case that the RRC parameter is configured as "disable," or is not configured, it means that the legacy beam mechanism, e.g., the legacy beam indication mode is applied for the set of CORESETs.

The network side, e.g., the BS as shown in FIG. 1 will indicate one or more joint or DL common beams by a DCI in the common beam indication mode, e.g., one or more joint or DL common TCI states indicated by a TCI codepoint in a TCI field of a DCI. Herein, embodiments of the present application are illustrated concerning on at most two joint or DL common TCI states indicated by a TCI codepoint in a TCI field of a DCI. However, persons skilled in the art should well know that the illustrated technical solution can also be applied to similar scenarios with more than two joint or DL common beams.

Meanwhile, when the joint or DL common beam is indicated by a DCI, it is valid for all or subset of the set of CORESETs starting from an applicable time, which is the first slot that is at least a configured number of symbols according to UE capabilityafter the acknowledgement (ACK) of the DCI for indicating the joint or DL common beam(s).

For example, according to the agreement in RAN1 #104b-e, on Rel-17 DCI-based beam indication, regarding the application time of the beam indication, the first slot to apply the indicated TCI state is at least Y symbols after the last symbol of the acknowledgment of the joint or separate DL/UL beam indication. The Y symbols are configured by the gNB based on UE capability, which is also reported in units of symbols. For another example, in RAN1 #106bis-e, on Rel-17 DCI-based beam indication, regarding the application time of the beam indication, further down select one from the following alternatives for the case of CA:

Alt1: The first slot and the Y symbols are both determined on the carrier with the smallest SCS among the carrier(s) applying the beam indication Alt2: The first slot and the Y symbols are both determined on the carrier with smallest SCS among the carrier(s) applying the beam indication and the UL carrier carrying the acknowledgment Alt3: The first slot and the Y symbols are both determined on the UL carrier carrying the acknowledgment.

According to some embodiments of the present application, for a CORESET of the set of CORESETs, there may be two joint or DL common beams, e.g., two joint or DL common TCI states indicated by a TCI codepoint in a TCI field in a DCI are applicable in a slot. The network side, e.g., the BS as shown in FIG. 1 will determine both or only one of the two joint or DL common beams for a CORESET of the set CORESETs, and transmit the PDCCH in the CORESET in the slot according to the determined joint or DL common beam(s) to transmit downlink control information in step 203. Similarly, the remote side, e.g., the UE 103 as shown in FIG. 1 will determine both or only of the two joint or DL common beams applicable for the CORESET of the set CORESETs, and monitor the PDCCH in the CORESET in the slot according to the determined joint or DL common beam(s) to receive downlink data (including control information etc.) in step 204.

According to current 3GPP specification(s), receiving/transmitting a beam of downlink transmission can be represented by decoding/transmitting the resource elements (REs) of the downlink transmission assuming a DM-RS antenna port of the downlink transmission quasi co-located associated with a set of RS, e.g. a synchronization signal (SS)/physical broadcast channel (PBCH) block (SSB) or a channel state information-reference signal (CSI-RS) resource, or one or more RSs configured by a TCI state. Herein, a joint or DL common beam can be represented by a joint or DL common TCI state.

Accordingly, the apparatus in the network side, e.g., the BS 101 in FIG. 1 transmitting PDCCH in a CORESET with one or two joint or DL common TCI state of the two joint or DL common TCI states can be illustrated as: transmitting PDCCH in the CORESET, wherein a DM-RS antenna port of the PDCCH is quasi co-located with a set of RSs in one or two joint or DL common TCI state of the two joint or DL common TCI states with respect to a set of QCL parameters. The apparatus in the remote side, e.g., the UE 103 in FIG. 1 monitoring PDCCH in the CORESET with one or two joint or DL common beam of the two joint or DL common TCI states can be illustrated as: monitoring PDCCH in the CORESET, wherein a DM-RS antenna port of the PDCCH is quasi co-located with a set of RSs in one or two joint or DL common TCI state of the two joint or DL common TCI states with respect to a set of QCL parameters.

Whether a DM-RS antenna port of the PDCCH is quasi co-located with a set of RSs in one of the two joint or DL common TCI states or both of the two joint or DL common TCI states with respect to a set of QCL parameters depends on whether the CORESET is able to be configured with two TCI states (or whether is able to transmit or receive or monitor with two beams or two TCI states). In the case that the CORESET is able to be configured with two TCI states, the DM-RS antenna port of the PDCCH is quasi co-located with a set of RSs in the two joint or DL common TCI states with respect to a set of QCL parameters. That is, both the two joint or DL common beams applicable for the CORESET in the slot are determined for PDCCH in the CORESET in the slot. In the case that the CORESET is only able to be configured with one TCI state, the DM-RS antenna port of the PDCCH is quasi co-located with a set of RSs in one joint or DL common TCI state of the two joint or DL common TCI states. That is, only one of the two joint or DL common beams applicable for the CORESET in the slot is determined for PDCCH in the CORESET in the slot.

According to some embodiments of the present application, whether the CORESET is able to be configured with two beams (e.g., two joint or DL common TCI states) or is only able to be configured with one beam (e.g., one joint or DL common TCI state) is configured by a higher layer signaling, e.g., a RRC signaling. For example, the network side may configure a CORESET to be in a SFN mode by a RRC signaling (sfnSchemeA or sfnSchemeB) and transmit the RRC signaling to the remote side, which indicates that the CORESET is able to be configured with two beams, e.g., two joint or DL common TCI states. In another example, if the network side does not configure the RRC signaling for a CORESET to the remote side, it indicates that the CORESET is only able to be configured with one of the two beams. That is, the CORESET is unable to be configured with two joint or DL common beams and only one of the two joint or DL common beams can be configured for the CORESET.

In the case that the CORESET is only able to be configured with one beam (e.g., one joint or DL common TCI state) of the two joint or DL common beams applicable in a slot, the one joint or DL common beam can be determined from the two joint or DL common beams applicable in the slot for the CORESET based on various manners, e.g., based on default configuration information or signaled configuration information. The signaled configuration information can be indicated by a higher layer signaling, e.g., a RRC signaling, a MAC CE or a DCI etc.

More detailed embodiments will be illustrated in view of four different configuration manners in the following. Meanwhile, considering the consistency between the network side and the remote side, even if some of the following descriptions are provided mainly concerning on one side, e.g., remote side for simplification, persons skilled in the art should well understand the corresponding operations in the other side, e.g., network side.

Based on Default Configuration Information (Scheme 1)

In some embodiments of the present application, always the only one joint or DL common beam is determined from the two joint or DL common beams applicable in the slot for the CORESET based on default configuration information. According to Scheme 1, the default configuration information will define that when two joint or DL common beams are applicable for a CORESET in a cell in a slot, a default beam, e.g., the first one or the second one of the two joint or DL common beams will be determined for the CORESET which is predefined or fixed. For example, the two joint or DL common beams are represented by two joint or DL common TCI states indicated by a TCI codepoint in a TCI field of a DCI, and the default configuration information may indicate that the first one of the two joint or DL common TCI states is determined for the CORESET as the default one, or indicate the second one of the two joint or DL common TCI states is determined for the CORESET as the default one. It should be noted that the default configuration information is fixed or predefined in specification which does not need to inform the remote side.

The default configuration information can be independently used for beam determination or be a back off of the signaled configuration information. For example, when there is no signaled configuration information indicated from the network side, the remote side will use the default configuration information for beam determination.

Based on RRC Signaling (Scheme 2)

According to Scheme 2, the signaled configuration information is indicated by a RRC signaling associated with the CORESET. When there are two joint or DL common beams for a CORESET applicable in a slot, e.g., two joint or DL common TCL states, the RRC signaling indicates the first one of the two joint or DL common beams will be determined for the CORESET, or indicates the second one of the two joint or DL common beams will be determined for the CORESET.

According to some embodiments of the present application, a RRC parameter can be included in the RRC csignaling for the CORESET to indicate which one of the two joint or DL common beams is used for the CORESET when two joint or DL common beams are applicable for the CORESET in a slot. An exemplary RRC parameter will be configured to have two states, wherein the first state indicates that the first joint or DL common beam is determined for the CORESET and the second state indicates that the second joint or DL common beam is determined for the CORESET. The RRC parameter is only valid when two joint or DL common beams are applicable for the CORESET in the slot. If only one joint or DL common beam is applicable for the CORESET in a slot, the remote apparatus, e.g., UE will monitor PDCCH in the CORESET with the only one joint or DL common beam in the slot. When such a RRC parameter is not included in the RRC signaling, the default configuration information can be used for beam determination.

For example, UE receives a RRC signaling indicates that the first joint or DL common TCI state will be determined for a CORESET only able to be configured with one TCI state. Then, when there are two joint or DL common TCI states indicated by a TCI codepoint in a TCI field in a DCI applicable in a slot, the UE will monitor PDCCH in the CORESET with the first one of the two joint or DL common TCI states in the slot. In another example, UE receives a RRC signaling indicates that the second joint or DL common TCI state will be determined for a CORESET only able to be configured with one TCI state. Then, when there are two joint or DL common TCI states indicated by a TCI codepoint in a TCI field in a DCI applicable in a slot, the UE will monitor PDCCH in the CORESET with the second one of the two joint or DL common TCI states in the slot.

An exemplary enhanced RRC signaling for a CORESET is illustrated below compared with the RRC configuration in TS 38.331, wherein a parameter "commonBeamSelection" is added.

```
ControlResourceSet ::=            SEQUENCE {
   controlResourceSetId              ControlResourceSetId,
   commonBeamSelection            CHOICE {0,1}              OPTIONAL
   frequencyDomainResources          BIT STRING (SIZE (45)),
   duration                          INTGEGER (1..maxCoReSetDuration),
   cce-REG-MappingType               CHOICE {
      interleaved                       SEQUENCE {
         reg-BundleSize                    ENUMERATED {n2, n3, n6},
         interleaverSize                   ENUMERATED {n2, n3, n6},
         shiftIndex
INTGEGER(0..maxNrofPhysicalResourceBlocks-1)               OPTIONAL -- Need S
      },
      nonInterleaved                    NULL
   },
   precoderGranularity               ENUMERATED {sameAsREG-bundle,
allContiguousRBs},
   tci-StatesPDCCH-ToAddList         SEQUENCE(SIZE (1..maxNrofTCI-StatesPDCCH)) OF
TCI-StateId OPTIONAL, -- Cond NotSIB1-initialBWP
   tci-StatesPDCCH-ToReleaseList     SEQUENCE(SIZE (1..maxNrofTCI-StatesPDCCH)) OF
TCI-StateId OPTIONAL, -- Cond NotSIB1-initialBWP
   tci-PresentInDCI                     ENUMERATED {enabled}
OPTIONAL, -- Need S
   pdcch-DMRS-ScramblingID              INTEGER (0..65535)
OPTIONAL, -- Need S
   ...,
   [[
   rb-Offset-r16                     INTEGER (0..5)
OPTIONAL, -- Need S
   tci-PresentDCI-1-2-r16            INTEGER (1..3)
OPTIONAL, -- Need S
   coresetPoolIndex-r16              INTEGER (0..1)
OPTIONAL, -- Need S
   controlResourceSetId-v1610        ControlResourceSetId-v1610
OPTIONAL  -- Need S
   ]]
}
```

When the parameter commonBeamSelection is configured as '0,' it indicates that the first joint or DL common TCI state will be determined for the CORESET in a slot in the case that there are two joint or DL common TCI states indicated by a TCI codepoint in a TCI field in a DCI applicable in the slot. When the parameter commonBeamSelection is configured as '1,' it indicates that the second joint or DL common TCI state will be determined for the CORESET in a slot in the case that there are two joint or DL common TCI states indicated by a TCI codepoint in a TCI field in a DCI applicable in the slot. When the parameter commonBeamSelection is not configured for the CORESET, the default one determined based on the default configuration information, e.g., the first or second joint or DL common TCI state will be determined for the CORESET in the slot.

Based on MAC CE (Scheme 3)

According to Scheme 3, the signaled configuration information is indicated by a MAC CE associated with the CORESET. When there are two joint or DL common beams are applicable for a CORESET in a slot, e.g., two joint or DL common TCL states, the MAC CE indicates the first one of the two joint or DL common beams will be determined for the CORESET, or indicates the second one of the two joint or DL common beams will be determined for the CORESET. A single MAC CE can indicate such configuration information for one or more CORESETs that are only able to be configured with only one beam in a cell.

According to some embodiments of the present application, a bit in the MAC CE can be used to indicate which one of the two joint or DL common beams is used for a corresponding CORESET when two joint or DL common beams are applicable for the CORESET in a slot. An exemplary bit in a MAC CE will be configured for a corresponding CORESET by setting as '0' or '1.' When the bit is set as '0,' it indicates that the first joint or DL common beam will be determined for the CORESET, when the bit is set as '1,' it indicates that that the second joint or DL common beam will be determined for the CORESET, and vice versa. Such a bit in a MAC CE is only valid when two joint or DL common beams are applicable for the CORESET in the slot. If only one joint or DL common beam is applicable for the CORESET in a slot, the remote apparatus, e.g., UE will monitor PDCCH in the CORESET with the only one joint or DL common beam in the slot. In addition, when the MAC CE needs to indicate such information to multiple CORESETs, the MAC CE will include multiple such bits, each one corresponding to a CORESET to be indicated.

For example, UE receives a MAC CE indicates that the first joint or DL common TCI state will be determined for a CORESET only able to be configured with one TCI state. Then, when there are two joint or DL common TCI states indicated by a TCI codepoint in a TCI field in a DCI applicable in a slot, the UE will monitor PDCCH in the CORESET with the first one of the two joint or DL common TCI states in the slot. In another example, UE receives a MAC CE indicates that the second joint or DL common TCI state will be determined for a CORESET only able to be configured with one TCI state. Then, when there are two joint or DL common TCI states indicated by a TCI codepoint in a TCI field in a DCI applicable in a slot, the UE will monitor PDCCH in the CORESET with the second one of the two joint or DL common TCI states in the slot. For a MAC CE not including such a bit for the CORESET, the default configuration information will be used for beam determination.

According to some embodiments of the present application, an exemplary MAC CE can indicate an identity of the cell for which the MAC CE is applied, an identity of at least one CORESET only able to be configured with one TCI state in the cell, and which one of the two joint or DL common TCI states will be determined for a corresponding CORESET of the at least one CORESET only able to be configured with one TCI state.

FIG. 3 illustrates an exemplary MAC CE designed under Scheme 3 according to some embodiments of the present application. Specifically, the exemplary MAC CE shown in FIG. 3 has a variable size with the following fields:

Serving Cell ID: This field indicates the identity of the Serving Cell for which the MAC CE applies. The length of the field is 5 bits. If the indicated Serving Cell is configured as part of a simultaneousTCI-UpdateList1 or simultaneousTCI-UpdateList2 as specified in TS 38.331 [5], this MAC CE applies to all the Serving Cells in the set simultaneousTCI-UpdateList1 or simultaneousTCI-UpdateList2, respectively;

CORESET ID: This field indicates a Control Resource Set identified with ControlResourceSetld as specified in TS 38.331 [5], for which the TCI State is being indicated. In case the value of the field is 0, the field refers to the Control Resource Set configured by controlResourceSetZero as specified in TS 38.331 [5]. The length of the field is 4 bits;

C: This field indicates which joint or DL common TCI state of two joint or DL common TCI states is determined for a Control Resource Set identified by CORESET ID field if the two joint or DL common TCI states are applicable. If it is set as '0', it indicates the first joint or DL common TCI state is determined for the Control Resource Set identified by CORESET ID field if two joint or DL common TCI states are applicable. If it is set as '1', it indicates the second joint or DL common TCI state is determined for the Control Resource Set identified by CORESET ID field if two joint or DL common TCI states are applicable.

R: Reserved bit, set to 0.

Persons skilled in the art should understand that the field "C" is only named for illustration, it may be expressed in other wording, which should not be used to limit the scope of the present application.

According to some other embodiments of the present application, the MAC CE indicates the joint or DL common beam for all CORESETs in a serving cell (or cell) by a bit-map indication method. The MAC CE may indicate an identity of the cell for which the MAC CE is applied, and which one of the two joint or DL common TCI states will be determined for a corresponding CORESET only able to be configured with one TCI state in the cell identified by a bit map.

FIG. 4 illustrates another exemplary MAC CE designed under Scheme 3 according to some other embodiments of the present application. Considering that the maximum number of CORESETs in a serving cell is 16, 16 bits can be used to indicate the joint or DL common beam for each CORESET in the serving cell by a bit map in the case that two joint or DL common beams are applicable in a slot. Specifically, the exemplary MAC CE shown in FIG. 4 has a variable size with the following fields:

Serving Cell ID: This field indicates the identity of the Serving Cell for which the MAC CE applies. The length of the field is 5 bits. If the indicated Serving Cell is configured as part of a simultaneousTCI-UpdateList1 or simultaneousTCI-UpdateList2 as specified in TS 38.331 [5], this MAC CE applies to all the Serving Cells in the set simultaneous TCI-UpdateList1 or simultaneousTCI-UpdateList2, respectively;

Ci: This field indicates which joint or DL common TCI states is determined for a Control Resource Set identified by whose CORESET ID equals i in a serving cell identified by the Serving Cell ID in the MAC CE. If it is set as '0', it indicates the first joint or DL common TCI state is determined for the Control Resource Set if two joint or DL common TCI states are applicable. If it is set as '1', it indicates the second joint or DL common TCI state is determined for the Control Resource Set if two joint or DL common TCI states are applicable. This field is valid only when two joint or DL common TCI states are applicable in the serving cell and the CORESET with CORESET ID equaling i is not configured to be able to be received with two TCI states. And if there is no CORESET with ID i in the serving cell, then this field will be ignored.

R: Reserved bit, set to 0.

Persons skilled in the art should understand that the field "Ci" is only named for illustration, it may be expressed in other wording, which should not be used to limit the scope of the present application.

Based on DCI (Scheme 4)

According to Scheme 4, the signaled configuration information is indicated by a DCI. For example, the signaled configuration information is indicated by a corresponding field (hereafter, referred to as an indication field for distinguishing from the TCI field) of a DCI for indicating the joint or DL common beams, which can be indicated for each CORESET in a serving cell. When there are two joint or DL common beams, e.g., two joint or DL common TCL states indicated by a TCI codepoint in a TCI field in a DCI, the indication field will be included in the DCI for indicating the first one of the two joint or DL common beams will be determined for the CORESET, or indicating the second one of the two joint or DL common beams will be determined for the CORESET. For a DCI with DL assignment for joint or DL common TCI state indication, the indication field is newly added compared with the legacy one and the presence of this field can be configured by a RRC signaling. For a DCI without DL assignment for joint or DL common TCI state indication, some bits of the unused fields of the DCI can be reinterpreted as the indication field to indicate the joint or DL common TCI state for each CORESET in the serving cell. The beam indication for a CORESET in an indication field of the DCI for beam indication is only valid when two joint or DL common TCI states are applicable for the CORESET in a slot. If only one joint or DL common TCI state is applicable for a CORESET in a slot, then UE will monitor PDCCH in the CORESET with the only one joint or DL common TCI state in the slot.

The applicable time of the signaled configuration information in the DCI is as the same as the common TCI state(s) indicated by the DCI where it is applicable from the first slot which is at least a number (Y) of symbols of the acknowledgment of the DCI. Besides, the signaled configuration information in the DCI can only be changed when the joint or DL common TCI state(s) in the DCI is changed from the applicable joint or DL common TCI state(s) in the slot where the DCI is received. The number (Y) of symbols can be configured by a RRC signaling based on the capability of the UE. Accordingly, UE will monitor PDCCH in a CORESET in the severing cell with one joint or DL common beam of the two joint or DL common beams according to the configuration information in the indication field from the first slot which is at least a number (Y) of symbols of the acknowledgment of the DCI.

According to some embodiments of the present application, a bit map method can be used to indicate the joint or DL common beam per CORESET in the indication field of the DCI for beam indication of CORESETs, and only the CORESETs which are not configured to be able to be received with two beams will be indicated by the indication field. Each bit of the indication field indicates which one of the two joint or DL common beams (e.g., TCI states) is determined for a corresponding CORESET, which is only able to be configured with one beam (e.g., TCI state). It is assumed that the maximum number of CORESET per serving cell is 16 in the scenario of multiple TRPs, and then the maximum number of bits of the indication field of the DCI is 16. In some embodiments of the present application, if the indication field is bit mapped per CORESET, then the most significant bit (MSB) to least significant bit (LSB) of the indication field can indicate the joint or DL common beams for the CORESETs unable to be configured with two joint or DL common beams from the lowest ID to the highest ID in the serving cell where joint or DL common beams are applied, and vice versa.

For example, if the bit corresponding to a CORESET is set as ‘0’, it indicates that the first joint or DL common TCI state is determined for the CORESET when two joint or DL common TCI states are applicable. If the bit corresponding to a CORESET is set as ‘1’, then it indicates that the second joint or DL common TCI state is determined for the CORESET when two joint or DL common TCI states are applicable.

Considering that the bits of the indication field by a bit map per CORESET is large, all CORESETs which are not able to be received with two joint or DL common beams in a cell can be configured into multiple CORESET groups by a RRC signaling to reduce the bit width of the indication field for CORESETs. Each bit of the indication field indicates which one of the two joint or DL common beams is determined for at least one CORESET of a corresponding CORESET group of the plurality of CORESET groups, wherein the at least one CORESET is only able to be configured with one beam. Besides the at least one CORESET only able to be configured with one beam, a CORESET group may include one or more CORESETs that are able to be configured with two beams. In some other embodiments of the present application, only CORESETs that are only able to be configured with one beam will be grouped.

It is assumed that the number of CORESET groups in a cell is N, and then there are N bits in the indication field for CORESETs by a bit map per CORESET group. Similarly, when the indication field is bit mapped per CORESET group, the MSB to LSB of the indication field can indicate the joint or DL common beam for all the CORESETs not able to be configured with two beams in CORESET groups from the lowest ID to the highest ID in the serving cell, and vice versa.

For example, if the bit corresponding to a CORESET group is set as ‘0’, it indicates that the first joint or DL common TCI state is determined for all CORESETs in the CORESET group except for CORESETs able to be configured with two TCI states when two joint or DL common TCI states are applicable. If the bit corresponding to a CORESET group is set as ‘1’, it indicates that the second joint or DL common TCI state is determined for all CORESETs in the CORESET group except for CORESETs able to be configured with two TCI states when two joint or DL common TCI states are applicable.

Figure 5:
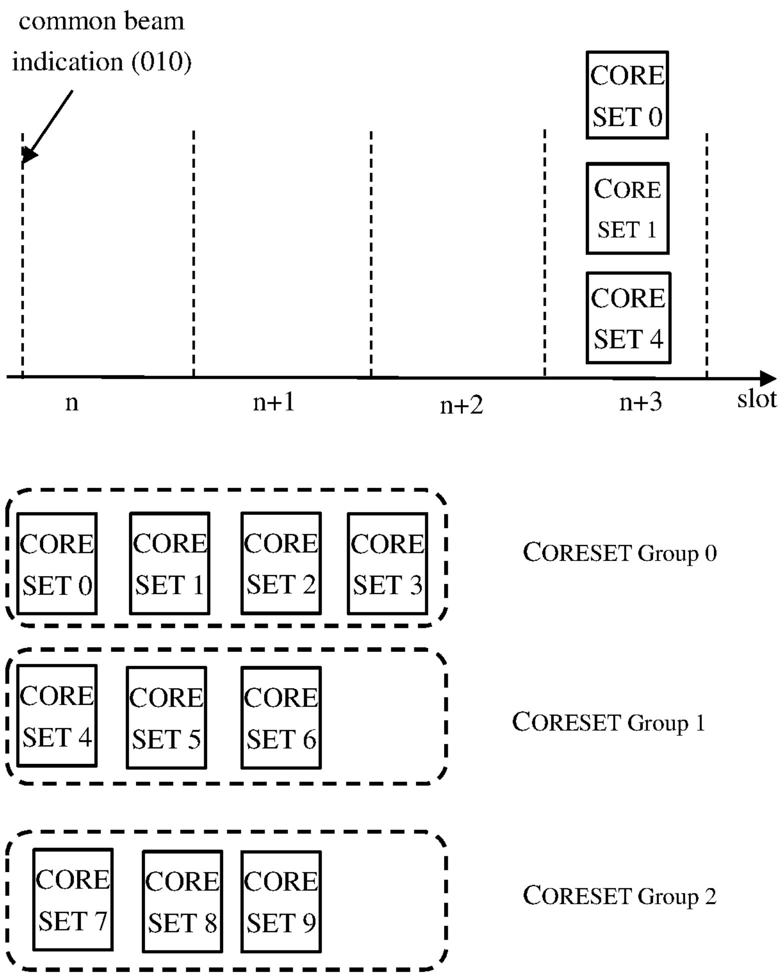
FIG. 5 illustrates an exemplary beam determination procedure under Scheme 4 where the bit map is per CORESET group according to some embodiments of the present application.

FIG. 5 illustrates an exemplary beam determination procedure under Scheme 4 where the bit map is per CORESET group according to some embodiments of the present application.

As shown in FIG. 5, it is assumed that ten CORESETs, i.e., CORESETs 0-9 are configured in a serving cell and three CORESET groups, i.e., CORESET Groups 0-2 are configured for the ten CORESETs. Specifically, CORESET 0, CORESET 1, CORESET2 and CORESET 3 are configured to be included in CORESET Group 0; CORESET 4, CORESET 5 and CORESET 6 are configured to be included in CORESET Group 1; and CORESET 7, CORESET Group 8 and CORESET Group 9 are configured to be included in CORESET Group 2. Besides, all the ten CORESETs are not able to be configured with two beams. A PDCCH indicates two joint or DL common TCI states by a TCI codepoint in a TCI field in a DCI in slot n, where the indication field for CORESET beam indication in the DCI is ‘010.’ That is, the indication field indicates that the first joint or DL common TCI state is determined for CORESET Group 0 composed of CORESET 0, CORESET 1, CORESET 2 and CORESET 3 and CORESET Group 2 composed of CORESET 7, CORESET 8 and CORESET 9; and the second joint or DL common TCI state is determined for CORESET Group 1 composed of CORESET 4, CORESET 5 and CORESET 6. The signaled configuration information for CORESETs and the two joint or DL common TCI states indicated in the DCI are applicable in slot n+3, which is the first slot that is at least a number (Y) of symbols of the acknowledgment of the DCI. It is assumed that the CORESETs in activated DL BWP in slot n+3 are CORESET 0, CORESET 1 and CORESET 4. Then, UE will monitor PDCCHs in CORESET 0 and CORESET 1 with the first joint or DL common TCI state, and monitor PDCCHs in CORESET 4 with the second joint or DL common TCI state from slot n+3 until the indicated joint or DL common TCI state(s) are changed according the TCI field of a DCI.

Besides methods, embodiments of the present application also propose an apparatus for beam determination. For example, FIG. 6 illustrates a block diagram of an apparatus 600 for beam determination according to some embodiments of the present application.

Figure 6:
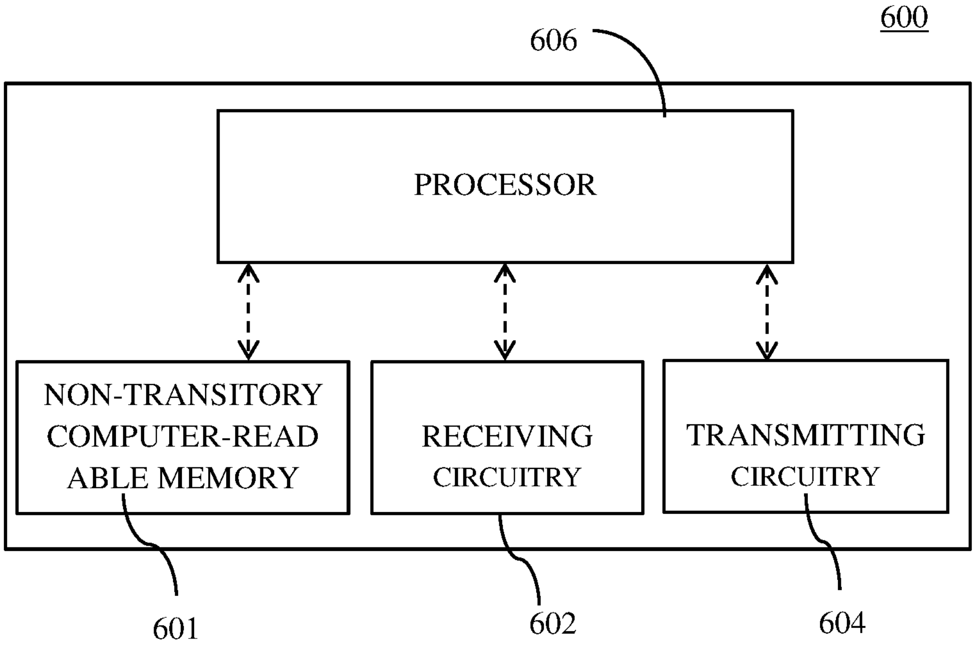
FIG. 6 illustrates a simplified block diagram of an apparatus for beam determination according to some embodiments of the present application.

As shown in FIG. 6, the apparatus 600 may include at least one non-transitory computer-readable medium 601, at least one receiving circuitry 602, at least one transmitting circuitry 604, and at least one processor 606 coupled to the non-transitory computer-readable medium 601, the receiving circuitry 602 and the transmitting circuitry 604. The apparatus 600 may be a terminal device (e.g., a UE) configured to perform a method illustrated in the above or the like.

Although in this figure, elements such as the at least one processor 606, transmitting circuitry 604, and receiving circuitry 602 are described in the singular, the plural is contemplated unless a limitation to the singular is explicitly stated. In some embodiments of the present application, the receiving circuitry 602 and the transmitting circuitry 604 can be combined into a single device, such as a transceiver. In certain embodiments of the present application, the apparatus 600 may further include an input device, a memory, and/or other components.

In some embodiments of the present application, the non-transitory computer-readable medium 601 may have stored thereon computer-executable instructions to cause a processor to implement the method with respect to the terminal device as described above. For example, the computer-executable instructions, when executed, cause the processor 606 interacting with receiving circuitry 602 and transmitting circuitry 604, so as to perform the steps with respect to the apparatus in the remote side, e.g., UE as depicted above.

For example, an apparatus in the remote side, e.g., UE includes: at least one non-transitory computer-readable medium having computer-executable instructions stored thereon; at least one receiving circuitry; at least one transmitting circuitry; and at least one processor coupled to the at least one non-transitory computer-readable medium, the at least one receiving circuitry and the at least one transmitting circuitry, wherein by the cooperation of the at least one non-transitory computer-readable medium, at least one receiving circuitry, at least one transmitting circuitry, and at least one processor, the apparatus is configured to: receive an indication indicating a joint or DL common beam mechanism is applied for a set of CORESETs configured for a UE in a cell; and for a CORESET of the set of CORESETs, in the case that there are two joint or DL common TCI states indicated by a TCI codepoint in a TCI field in a DCI are applicable in a slot, monitor PDCCH in the CORESET in the slot, wherein: in the case that the CORESET is able to be configured with two TCI states, a DM-RS antenna port of the PDCCH is quasi co-located with a set of RSs in the two joint or DL common TCI states with respect to a set of QCL parameters; and in the case that the CORESET is only able to be configured with one TCI state, the DM-RS antenna port of the PDCCH is quasi co-located with a set of RSs in one joint or DL common TCI state of the two joint or DL common TCI states, wherein the one joint or DL common TCI state is determined for the CORESET based on default configuration information or signaled configuration information.

In some embodiments of the present application, the non-transitory computer-readable medium 601 may have stored thereon computer-executable instructions to cause a processor to implement the method with respect to the CU or DU as described above. For example, the computer-executable instructions, when executed, cause the processor 606 interacting with receiving circuitry 602 and transmitting circuitry 604, so as to perform the steps with respect to the apparatus in the network side, e.g., a BS illustrated above.

For example, an apparatus in the network side, e.g., a BS includes: at least one non-transitory computer-readable medium having computer-executable instructions stored thereon; at least one receiving circuitry; at least one transmitting circuitry; and at least one processor coupled to the at least one non-transitory computer-readable medium, the at least one receiving circuitry and the at least one transmitting circuitry, wherein by the cooperation of the at least one non-transitory computer-readable medium, at least one receiving circuitry, at least one transmitting circuitry, and at least one processor, the apparatus is configured to: transmit an indication indicating a joint or DL common beam mechanism is applied for a set of CORESETs configured for a UE in a cell; and for a CORESET of the set of CORESETs, in the case that there are two joint or DL common TCI states indicated by a TCI codepoint in a TCI field in a DCI are applicable in a slot, transmit PDCCH in the CORESET in the slot, wherein: in the case that the CORESET is able to be configured with two TCI states, a DM-RS antenna port of the PDCCH is quasi co-located with a set of RSs in the two joint or DL common TCI states with respect to a set of QCL parameters; and in the case that the CORESET is only able to be configured with one TCI state, the DM-RS antenna port of the PDCCH is quasi co-located with a set of RSs in one joint or DL common TCI state of the two joint or DL common TCI states, wherein the one joint or DL common TCI state is determined for the CORESET based on default configuration information or signaled configuration information.

Figure 7:
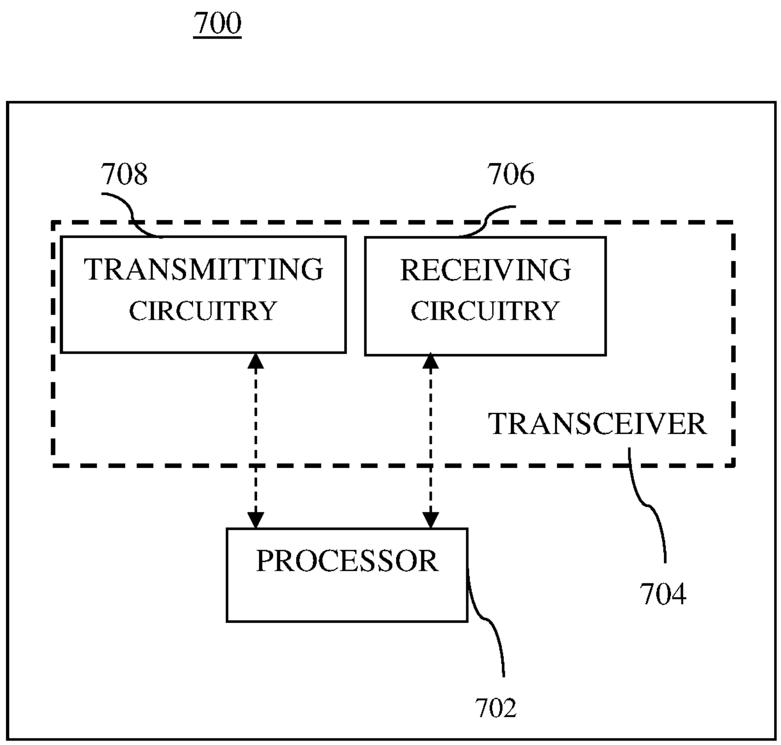
FIG. 7 is a block diagram of an apparatus for beam determination according to some other embodiments of the present application.

FIG. 7 is a block diagram of an apparatus for beam determination according to some other embodiments of the present application.

Referring to FIG. 7, the apparatus 700, for example a UE or a BS may include at least one processor 702 and at least one transceiver 704. The transceiver 704 may include at least one separate receiving circuitry 706 and transmitting circuitry 708, or at least one integrated receiving circuitry 706 and transmitting circuitry 708.

According to some embodiments of the present application, when the apparatus 700 is a UE, the processor is configured to: receive an indication indicating a joint or DL common beam mechanism is applied for a set of CORESETs configured for a UE in a cell; and for a CORESET of the set of CORESETs, in the case that there are two joint or DL common TCI states indicated by a TCI codepoint in a TCI field in a DCI are applicable in a slot, monitor PDCCH in the CORESET in the slot, wherein: in the case that the CORESET is able to be configured with two TCI states, a DM-RS antenna port of the PDCCH is quasi co-located with a set of RSs in the two joint or DL common TCI states with respect to a set of QCL parameters; and in the case that the CORESET is only able to be configured with one TCI state, the DM-RS antenna port of the PDCCH is quasi co-located with a set of RSs in one joint or DL common TCI state of the two joint or DL common TCI states, wherein the one joint or DL common TCI state is determined for the CORESET based on default configuration information or signaled configuration information.

According to some other embodiments of the present application, when the apparatus 700 is a BS, the processor may be configured to: transmit an indication indicating a joint or DL common beam mechanism is applied for a set of CORESETs configured for a UE in a cell; and for a CORESET of the set of CORESETs, in the case that there are two joint or DL common TCI states indicated by a TCI codepoint in a TCI field in a DCI are applicable in a slot, transmit PDCCH in the CORESET in the slot, wherein: in the case that the CORESET is able to be configured with two TCI states, a DM-RS antenna port of the PDCCH is quasi co-located with a set of RSs in the two joint or DL common TCI states with respect to a set of QCL parameters; and in the case that the CORESET is only able to be configured with one TCI state, the DM-RS antenna port of the PDCCH is quasi co-located with a set of RSs in one joint or DL common TCI state of the two joint or DL common TCI states, wherein the one joint or DL common TCI state is determined for the CORESET based on default configuration information or signaled configuration information.

The method according to embodiments of the present application can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present application provides an apparatus for beam determination, including a processor and a memory. Computer programmable instructions for implementing a method are stored in the memory, and the processor is configured to perform the computer programmable instructions to implement the method. The method may be a method as stated above or other method according to an embodiment of the present application.

An alternative embodiment preferably implements the methods according to embodiments of the present application in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present application provides a non-transitory, computer-readable storage medium having computer programmable instructions stored therein. The computer programmable instructions are configured to implement a method as stated above or other method according to an embodiment of the present application.

In addition, in this disclosure, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The terms "having," and the like, as used herein, are defined as "including."

What is claimed is:

1. A user equipment (UE) for wireless communication, comprising:

at least one memory; and at least one processor coupled with the at least one memory and operable to cause the UE to:

receive signaling that indicates one or more joint or downlink common transmission configuration indication (TCI) states are applied for a set of control resource sets (CORESETs) in a cell;

receive a downlink control information (DCI) that indicates two joint or downlink common TCI states of the one or more joint or downlink common TCI states are applicable in a slot; and monitor, for a CORESET of the set of CORESETs, a physical downlink control channel (PDCCH) in the CORESET in the slot, wherein a demodulation reference signal (DM-RS) antenna port of the PDCCH is quasi co-located with a set of RSs in one joint or downlink common TCI state of the two joint or downlink common TCI states based at least in part on the CORESET being configurable with one TCI state, and wherein the one joint or downlink common TCI state is based at least in part on one or more of default configuration information or signaled configuration information.

2. The UE of claim 1, wherein the default configuration information indicates that the one joint or downlink common TCI state is a first joint or downlink common TCI state of the two joint or downlink common TCI states or a second joint or downlink common TCI state of the two joint or downlink common TCI states.

3. The UE of claim 1, wherein the at least one processor is further operable to cause the UE to receive radio resource control (RRC) signaling comprising the signaled configuration information, wherein the RRC signaling is associated with the CORESET, indicating and wherein the signaled configuration information indicates that the one joint or downlink common TCI state is a first joint or downlink common TCI state of the two joint or downlink common TCI states or a second joint or downlink common TCI state of the two joint or downlink common TCI states.

4. The UE of claim 1, wherein the at least one processor is further operable to cause the UE to receive a medium access control (MAC) control element (CE) comprising the signaled configuration information, wherein the MAC CE is associated with the CORESET, indicating and wherein the signaled configuration information indicates that the one joint or downlink common TCI state is a first joint or downlink common TCI state of the two joint or downlink common TCI states or a second joint or downlink common TCI state of the two joint or downlink common TCI states.

5. The UE of claim 4, wherein the MAC CE indicates an identity of the cell for which the MAC CE is applied, an identity of at least one CORESET able to be configured with the one TCI state in the cell, and the one joint or downlink common TCI state for a corresponding CORESET of the at least one CORESET configurable with the one TCI state.

6. The UE of claim 4, wherein the MAC CE indicates an identity of the cell for which the MAC CE is applied and the one joint or downlink common TCI state for a corresponding CORESET configurable with the one TCI state in the cell identified by a bit map.

7. The UE of claim 1, wherein a field of the DCI indicates the signaled configuration information, and wherein the signaled configuration information indicates a first joint or downlink common TCI state of the two joint or downlink common TCI states or a second joint or downlink common TCI state of the two joint or downlink common TCI states.

8. The UE of claim 6, wherein each bit of a field of the MAC CE indicates the one joint or downlink common TCI state for the corresponding CORESET, wherein the corresponding CORESET belongs to a subset of CORESETs of the set of CORESETs, and wherein each CORESET of the subset of CORESETs is configurable with the one TCI state.

9. The UE of claim 6, wherein the set of CORESETs is grouped into a plurality of CORESET groups according to a radio resource control (RRC) signaling.

10. The UE of claim 9, wherein each bit of a field of the MAC CE indicates the one joint or downlink common TCI state for at least one CORESET of a CORESET group of the plurality of CORESET groups, wherein the at least one CORESET is configurable with the one TCI state.

11. The UE of claim 6, wherein the DCI is applicable starting from a slot that is at least a threshold number of symbols after an acknowledgment of the DCI, and wherein the at least one processor is further operable to cause the UE to receive radio resource control (RRC) signaling that indicates the threshold number of symbols based at least in part on a capability of the UE.

12. The UE of claim 1, wherein the at least one processor is further operable to cause the UE to receive radio resource control (RRC) signaling that indicates whether the CORESET is configurable with two TCI states or is configurable with the one TCI state.

13. A network apparatus for wireless communication, comprising:
- at least one memory; and
- at least one processor coupled with the at least one memory and operable to cause the network apparatus to:
  - transmit signaling that indicates one or more joint or downlink common transmission configuration indication (TCI) states are applied for a set of control resource sets (CORESETs) configured for a user equipment (UE) in a cell;
  - transmit a downlink control information (DCI) that indicates two joint or downlink common TCI states of the one or more joint or downlink common TCI states are applicable in a slot; and
  - transmit, for a CORESET of the set of CORESETs, a physical downlink control channel (PDCCH) in the CORESET in the slot, wherein a demodulation reference signal (DM-RS) antenna port of the PDCCH is quasi co-located with a set of RSs in one joint or downlink common TCI state of the two joint or downlink common TCI states based at least in part on the CORESET being configurable with one TCI state, and wherein the one joint or downlink common TCI state is based at least in part on one or more of default configuration information or signaled configuration information.

14. The network apparatus of claim 13, wherein the at least one processor is further operable to cause the network apparatus to transmit radio resource control (RRC) signaling comprising the signaled configuration information, wherein the RRC signaling is associated with the CORESET, and wherein the signaled configuration information indicates that the one joint or downlink common TCI state is a first joint or downlink common TCI state of the two joint or downlink common TCI states or a second joint or downlink common TCI state of the two joint or downlink common TCI states.

15. A method performed by a user equipment (UE), the method comprising:
- receiving signaling that indicates one or more joint or downlink common transmission configuration indication (TCI) states are applied for a set of control resource sets (CORESETs) in a cell;
- receiving a downlink control information (DCI) that indicates two joint or downlink common TCI states of the one or more joint or downlink common TCI states are applicable in a slot; and
- monitoring, for a CORESET of the set of CORESETs, a physical downlink control channel (PDCCH) in the CORESET in the slot, wherein a demodulation reference signal (DM-RS) antenna port of the PDCCH is quasi co-located with a set of RSs in one joint or downlink common TCI state of the two joint or downlink common TCI states based at least in part on the CORESET being configurable with one TCI state, and wherein the one joint or downlink common TCI state is based at least in part on one or more of default configuration information or signaled configuration information.

16. A method performed by a network apparatus, the method comprising:
- transmitting signaling that indicates one or more joint or downlink common transmission configuration indication (TCI) states are applied for a set of control resource sets (CORESETs) configured for a user equipment (UE) in a cell;
- transmitting a downlink control information (DCI) that indicates two joint or downlink common TCI states of the one or more joint or downlink common TCI states are applicable in a slot; and
- transmitting, for a CORESET of the set of CORESETs, a physical downlink control channel (PDCCH) in the CORESET in the slot, wherein a demodulation reference signal (DM-RS) antenna port of the PDCCH is quasi co-located with a set of RSs in one joint or downlink common TCI state of the two joint or downlink common TCI states based at least in part on the CORESET being configurable with one TCI state, and wherein the one joint or downlink common TCI state is based at least in part on one or more of default configuration information or signaled configuration information.

17. The network apparatus of claim 13, wherein the default configuration information indicates that the one joint or downlink common TCI state is a first joint or downlink common TCI state of the two joint or downlink common TCI states or a second joint or downlink common TCI state of the two joint or downlink common TCI states.

18. The network apparatus of claim 13, wherein the at least one processor is further operable to cause the network apparatus to transmit a medium access control (MAC) control element (CE) comprising the signaled configuration information, wherein the MAC CE is associated with the CORESET, and wherein the signaled configuration information indicates that the one joint or downlink common TCI state is a first joint or downlink common TCI state of the two joint or downlink common TCI states or a second joint or downlink common TCI state of the two joint or downlink common TCI states.

19. The network apparatus of claim 13, wherein a field of the DCI indicates the signaled configuration information, and wherein the signaled configuration information indicates a first joint or downlink common TCI state of the two joint or downlink common TCI states or a second joint or downlink common TCI state of the two joint or downlink common TCI states.

20. The network apparatus of claim 13, wherein the at least one processor is further operable to cause the network apparatus to receive radio resource control (RRC) signaling that indicates whether the CORESET is configurable with two TCI states or is configurable with the one TCI state.

* * * * *